US006233399B1

(12) United States Patent
Walter

(10) Patent No.: US 6,233,399 B1
(45) Date of Patent: May 15, 2001

(54) FILM DROP-OFF APPARATUS AND METHOD

(75) Inventor: Joanne S. Walter, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/272,041

(22) Filed: Mar. 18, 1999

(51) Int. Cl.[7] .................................................... G03B 15/00
(52) U.S. Cl. ................................................ 396/2; 396/364
(58) Field of Search ........................ 396/564, 2; 235/381, 235/379, 380, 385; 705/401; 312/211; 345/961, 978, 344

(56) References Cited

U.S. PATENT DOCUMENTS

| | | | | |
|---|---|---|---|---|
| D. 251,649 | | 4/1979 | Devin et al. | D6/188 |
| 4,803,348 | | 2/1989 | Lohrey et al. | 235/381 |
| 5,113,351 | * | 5/1992 | Bostic | 235/381 |
| 5,499,707 | | 3/1996 | Steury | 194/217 |
| 5,652,936 | | 7/1997 | Klees et al. | 396/564 |
| 5,666,215 | * | 9/1997 | Fredlund et al. | 358/487 |
| 5,667,288 | | 9/1997 | Kang | 312/211 |
| 5,710,889 | * | 1/1998 | Clark et al. | 235/379 |
| 5,737,729 | | 4/1998 | Denman | 705/401 |
| 5,971,273 | * | 10/1999 | Vallaire | 235/381 |

* cited by examiner

*Primary Examiner*—D. Rutledge
(74) *Attorney, Agent, or Firm*—Paul W. Martin

(57) ABSTRACT

A film drop-off apparatus which expedites film processing based upon delivery choice. The apparatus includes a computer; a display controlled by the computer which displays instructions to a customer, including photo delivery options during a film processing transaction; an input device controlled by the computer which records a customer choice for a photo delivery time; and communication circuitry which sends an alert message to the film laboratory based upon the customer choice.

9 Claims, 5 Drawing Sheets

FILM DROP-OFF APPARATUS AND METHOD

BACKGROUND OF THE INVENTION

The present invention relates to photo processing and more specifically to a film drop-off apparatus and method.

Film drop-off kiosks are commonplace in grocery stores and other retail establishments. A customer removes a film drop envelope from an envelope bin, fills out the envelope with name and address information, puts film to be developed into the envelope, and drops the envelope into a storage bin for pickup by photo processing personnel. More sophisticated film drop-off kiosks include computer interfaces and provide additional features for customers.

Film drop-off kiosks have only limited processing and delivery capability. Therefore, it would be desirable to provide a film drop-off kiosk and method which reduce processing and delivery time.

SUMMARY OF THE INVENTION

In accordance with the teachings of the present invention, a film drop-off apparatus and method are provided.

The apparatus includes a computer; a display controlled by the computer which displays instructions to a customer, including photo delivery options during a film processing transaction; an input device controlled by the computer which records a customer choice for a photo delivery time; and communication circuitry which sends an alert message to the film laboratory based upon the customer choice.

A film processing method includes displaying instructions to a customer, including photo delivery options during a film processing transaction; recording a customer choice for a photo delivery time; sending an alert message to the film laboratory based upon the customer choice; receiving the alert message by the film laboratory; and assigning a film development priority to the transaction based upon the received alert.

The film processing method may also include displaying instructions to a customer, including photo delivery options and a special promotion during a film processing transaction; recording a first customer choice for a photo delivery time and a second customer choice for the special promotion; and determining a price based upon the first and second choices.

The film processing method may also include delivering a bar code label identifying the transaction to the customer; reading the bar code label by a bar code reader coupled to the computer; and displaying a status of the transaction by the computer.

It is accordingly an object of the present invention to provide a film drop-off apparatus and method.

It is another object of the present invention to provide a film drop-off kiosk with a computer interface which records delivery choices by customers;

It is another object of the present invention to provide a film drop-off kiosk with a computer interface which alerts a photo processing laboratory of film processing priorities associated with the delivery choices;

It is another object of the present invention to provide a film drop-off kiosk with a computer interface which records customer information instead of requiring a customer to write the information by hand;

It is another object of the present invention to provide a film drop-off kiosk with a computer interface which can store and track customer orders;

It is another object of the present invention to provide a film drop-off method which records customer delivery choices and which alerts a photo processing laboratory of film processing priorities associated with the delivery choices.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
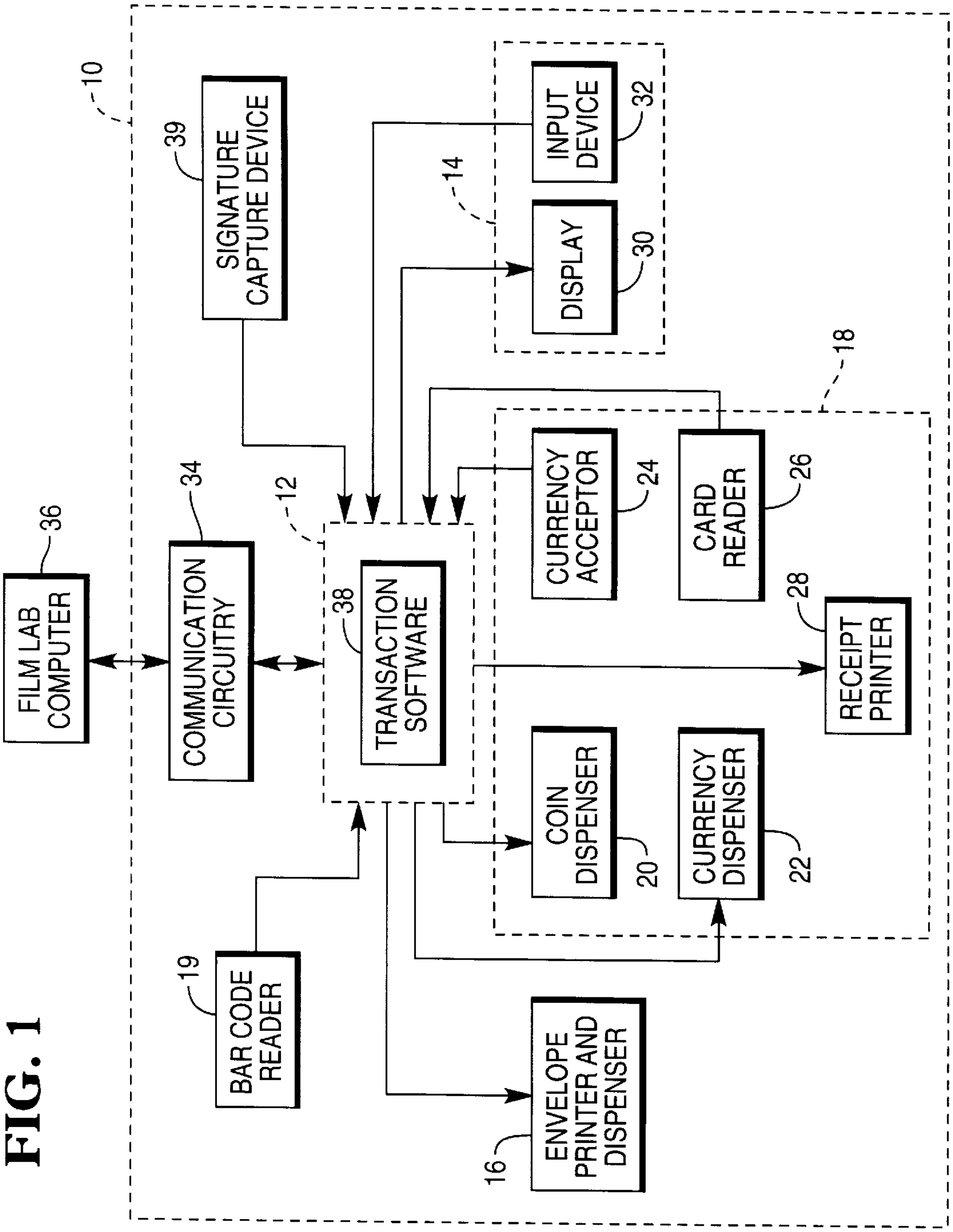
FIG. 1 is a block diagram of the film processing system, including a film drop-off kiosk of the present invention.

Referring to FIG. 1 of the drawings, there is shown therein a film drop-off apparatus 10 in a supermarket. Apparatus 10 primarily includes processor 12, interface modules 14, envelope printer and dispenser 16, payment modules 18, and bar code reader 19.

Processor 12 automates the functions of apparatus 10. For this purpose, processor 12 executes transaction software 38 which guides customers through film processing transactions, records customer choices, and accepts customer payment. Software 38 manages different delivery options available to a customer and helps customers track the status of film processing and delivery.

Interface modules 14 include display 30 and input device 32. Display 30 displays information to customers to assist them in completing a film processing transaction. Display 30 may by a cathode ray tube (CRT) or liquid crystal display (LCD).

Input device 32 records customer choices and other information in order to complete the transaction. Recording customer information further minimizes risk of loss, particularly the risk of loss associated with film envelopes with handwritten information. Input device 32 may be a keyboard.

Alternatively, interface modules 14 may be combined as a touch screen.

Envelope printer and dispenser 16 prints important customer and delivery information on film envelopes. For example, envelope printer and dispenser 16 prints customer name and address information recorded by input device 32.

Payment modules 18 allow customers to pay for film developing when they drop the film off. Payment modules 18 include coin dispenser 20, currency dispenser 22, currency acceptor 24, card reader 26, and receipt printer 28.

Bar code reader 19 allows customers to scan bar code labels on their receipts or film envelopes in order to track the status of their film. Film processing personnel periodically make status entries into film laboratory computer 36. Processor 12 downloads status information upon reading of bar code labels.

Coin dispenser 20 and currency dispenser 22 provide change to customers.

Currency acceptor 24 accepts paper currency from customers as payment.

Card reader 26 reads payment cards used by customers to make payment. Card reader 26 may include a magnetic stripe reader. Card reader 26 may also include a smart card reader or combination credit and smart card reader.

Receipt printer 28 prints customer receipts after payment has been made. Also, receipt printer 28 prints a bar code on the receipt. The customer may read the bar code using bar code reader 19 to determine the status of the film.

Communication circuitry 34 is a communication interface between processor 12 and film laboratory computer 36. In a first configuration, communication circuitry 34 may include a modem for communicating with an external film laboratory computer 36. In a second configuration, communication circuitry 34 may include an in-store processor, a network connection between the in-store processor and processor 12, and a modem connection between the in-store processor and an external film laboratory computer 36. In a third configuration, film laboratory computer 36 may be an in-store computer since some supermarkets have their own film processing labs. In this configuration, communication circuitry 34 includes a network connection between film laboratory computer 36 and processor 12, with or without an intermediately located in-store processor.

Under the present invention, processor 12 sends an alert message to film laboratory computer 36 in response to predetermined delivery choices made by a customer. For example, if a customer selects a "next day" delivery option, processor 12 sends an alert to film laboratory computer 36. Personnel at the film lab use the alerts to manage the order of processing film orders.

Communication circuitry 34 also facilitates delivery of order status information to apparatus 10 upon customer inquiry.

Figure 2:
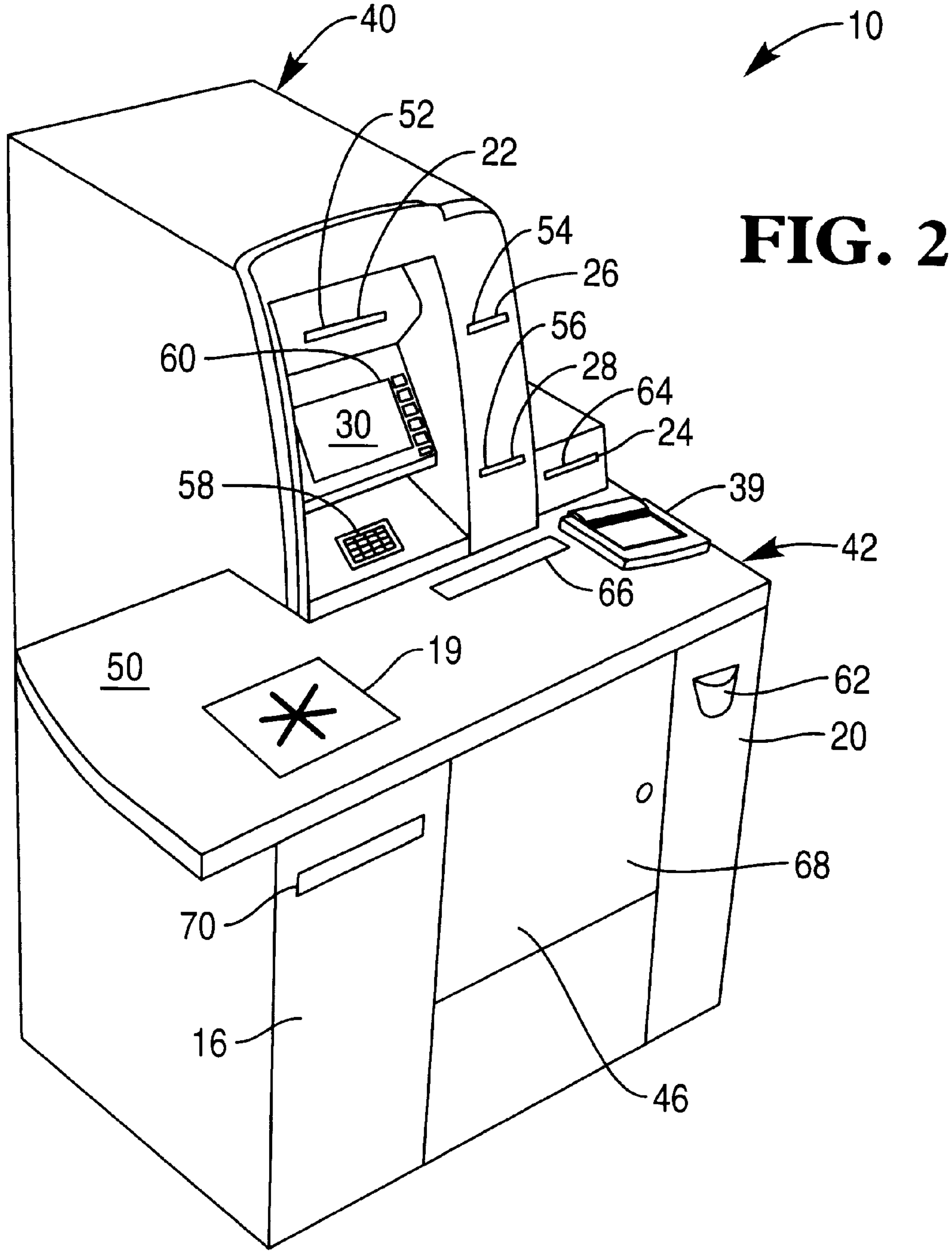
FIG. 2 is a perspective view of a first film drop-off kiosk.

With reference to FIG. 2, a first film drop-off kiosk 10 is shown in more detail.

Film drop-off apparatus 10 may be built upon a self-service financial terminal for performing banking transactions, also known as an automated teller machine (ATM). The banking transactions include cash withdrawal from a banking account and cash deposit into the account. The present invention also envisions a more simple platform, one which does not include such banking functions.

Film drop-off apparatus 10 primarily includes self-service terminal 40 and cabinet 42.

Self-service terminal 40 contains processor 12, currency dispenser 22, card reader 26, receipt printer 28, display 30, input device 32, and communication circuitry 34.

Preferably, self-service terminal 40 is an NCR multi-function ATM which executes software for guiding a customer through a film processing transaction. The software may also guide a customer through a banking transaction as part of the film processing transaction or independently of a film processing transaction. For example, customers may wish to pay for film processing transactions and receive money from their bank accounts to take with them.

Bar code reader 19 may be an NCR model 7880 bar code scanner.

Currency dispenser 22 ejects currency through slot 52.

Card reader 26 accepts cards through slot 54.

Receipt printer 28 ejects a receipt through slot 56.

Input device 32 includes keypad 58 and function keys 60.

Cabinet 42 fastens to self-service terminal 40 and includes envelope printer and dispenser 16, coin dispenser 20, currency acceptor 24, envelope collection bin 46, and work surface 50.

Envelope printer and dispenser 16 ejects an envelope with printed information thereon through slot 70.

Coin dispenser 20 ejects change coins into coin receptacle 62.

Currency acceptor 24 accepts currency through slot 64.

Envelope collection bin 46 receives envelopes containing undeveloped film through slot 66. Store personnel regularly empty envelope collection bin 46 through door 68.

Work surface 50 forms the top of cabinet 42.

Figure 3:
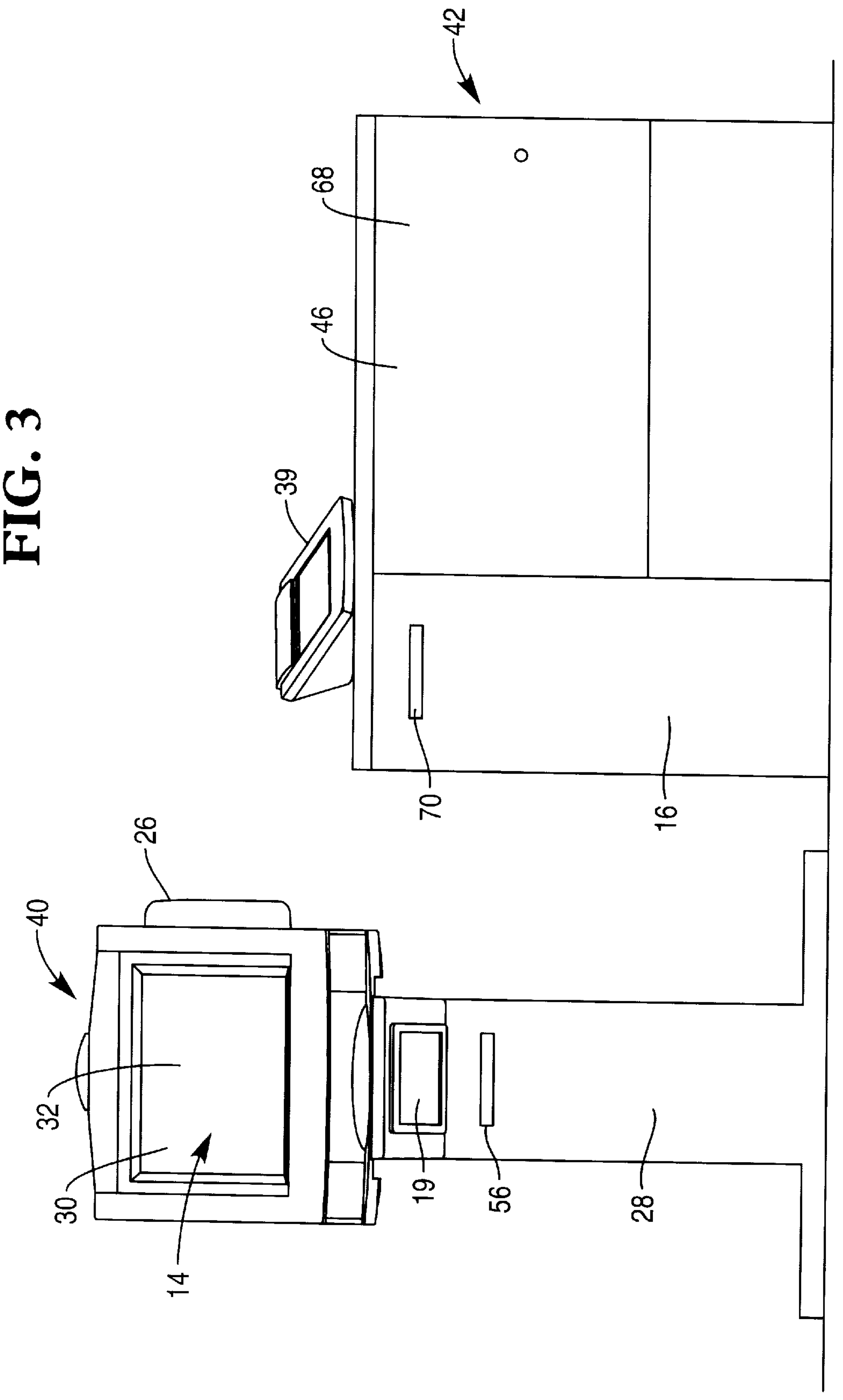
FIG. 3 is a perspective view of a second film drop-off kiosk.

With reference to FIG. 3, a second film drop-off kiosk 10 is shown in more detail.

Film drop-off apparatus 10 may be built upon a more simple platform, including an NCR 7401 self-service terminal.

The second drop-off apparatus 10 is otherwise similar to the first, except that it is illustrated without cash handling capability. It does not include coin dispenser 20, currency dispenser 22, and currency acceptor 24. Thus, credit card transactions are preferred. Also, interface modules 14 include a touch screen.

Figure 4A:
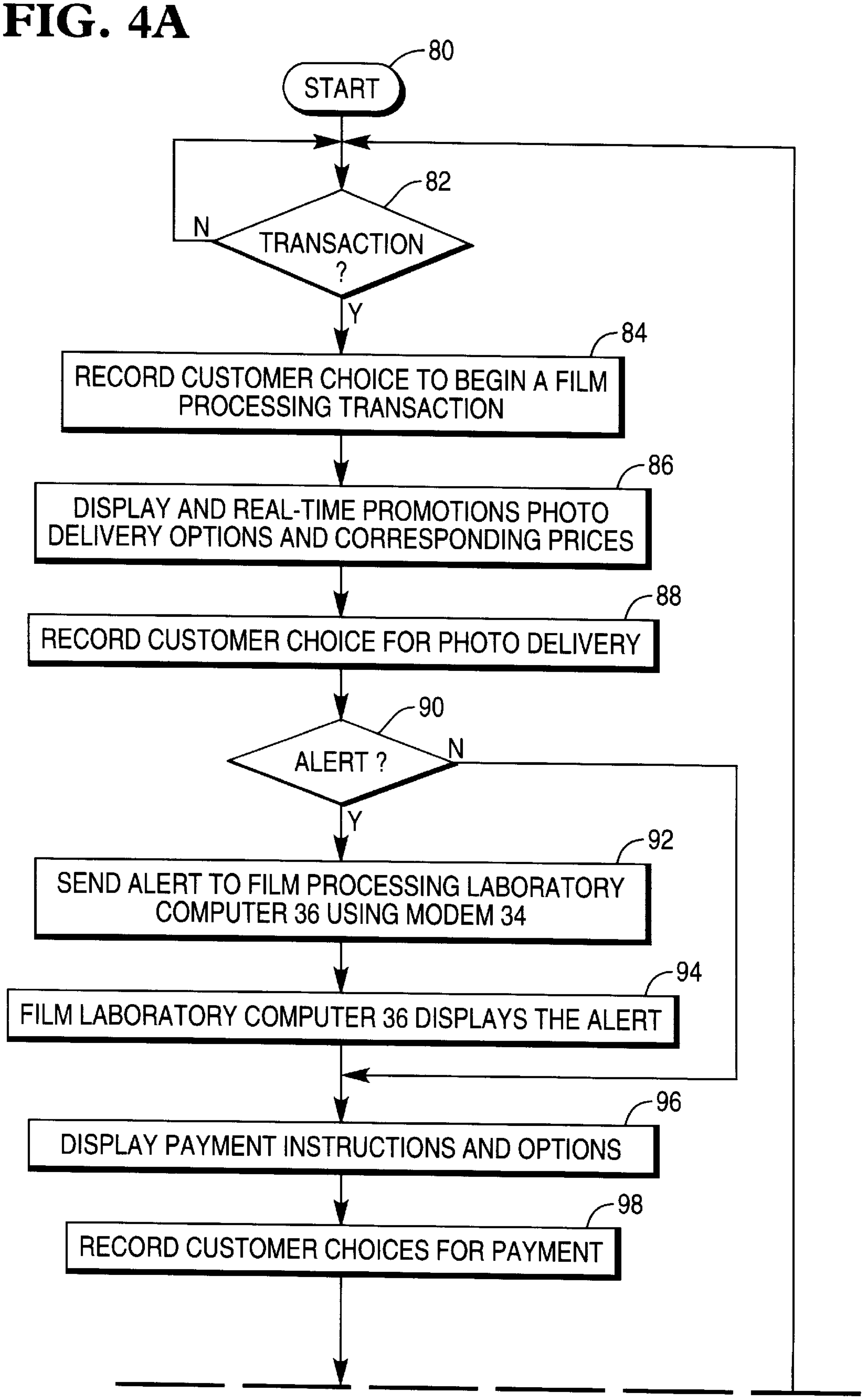
FIGS. 4A and 4B form a flow diagram illustrating the method of the present invention.
Figure 4B:
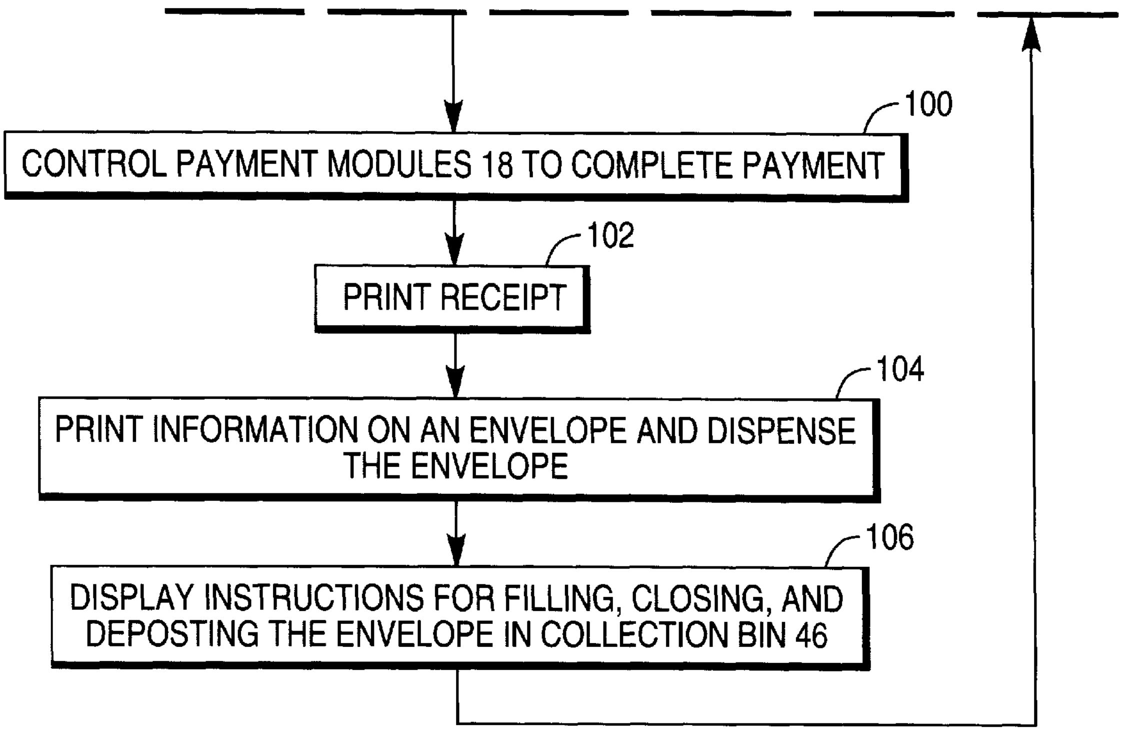

Turning now to FIGS. 4A and 4B, the film processing method of the present invention is illustrated in more detail beginning with start 80.

In order to use film drop-off apparatus 10, a customer approaches the counter 42 with undeveloped film.

In step 82, processor 12 causes display 30 to display an opening screen with instructions for starting a transaction and processor 12 otherwise waits for a customer to begin a transaction.

In step 84, input device 32 records a customer choice to begin a film processing transaction.

In step 86, processor 12 causes display 30 to display instructions to the customer, including photo delivery options and corresponding prices. Photo delivery options may include next-day delivery, three-day delivery, and other processing and delivery times. Shorter processing and delivery times are more costly.

Processor 12 may also cause display 30 to display real-time promotions and allow the customer to respond to the promotions using input device 32. Customer responses may be incorporated into the transaction as discounts or other special promotional pricing.

In step 88, input device 32 records a customer choice for photo delivery time.

In step 90, processor 12 determines whether the photo delivery time choice requires an alert to be sent to film laboratory computer 36 and, if so, determines the type of alert. If an alert should be sent, operation proceeds to step 92. Otherwise, operation proceeds to step 96.

In step 92, processor 12 sends an alert to film laboratory computer 36.

In step 94, film laboratory computer 36 displays the alert or otherwise notifies film processing personnel that an alert has been received. Film processing personnel rearrange their workload based upon the received alert. For example, if the alert indicated that the order was a next-day delivery order, then film processing personnel would assign a higher priority to the order when it arrives and process it before lower priority orders.

In step 96, processor 12 causes display 30 to display payment instructions and payment options.

In step 98, input device 32 records customer choices for payment.

In step 100, processor 12 controls payment modules 18 to record payment.

In step 102, processor 12 causes receipt printer 28 to print a receipt for the customer. Receipt printer 28 may also print promotional information on the receipt.

In step 104, processor 12 causes envelope printer and dispenser 16 to print customer choices and customer identification information on a film envelope and dispense the envelope. Envelope printer and dispenser 16 may also print promotional information on the envelope.

In step 106, processor 12 causes display 30 to display instructions for filling, closing, and depositing the envelope in collection bin 46. Operation returns to step 82 to wait for another customer.

Although the present invention has been described with particular reference to certain preferred embodiments thereof, variations and modifications of the present invention can be effected within the spirit and scope of the following claims.

What is claimed is:

1. A film processing method comprising:

displaying instructions to a customer, including photo delivery options during a film processing transaction by a film drop-off kiosk;

recording a customer choice for a photo delivery time by the film drop-off kiosk;

sending an alert message to the film laboratory if the photo delivery time associated with the customer choice is short enough by the film drop-off kiosk;

receiving the alert message by the film laboratory; and assigning a film development priority to the transaction based upon the alert by the film laboratory.

2. A film processing method comprising:

displaying instructions to a customer, including photo delivery options during a film processing transaction by a film drop-off kiosk;

recording a customer choice for a photo delivery time by the film drop-off kiosk;

determining whether the photo delivery time associated with the customer choice is short enough to require an alert to be sent to a film laboratory by the film drop-off kiosk;

if the alert is required, sending an alert message to the film laboratory by the film drop-off kiosk;

receiving the alert message by the film laboratory;

notifying film processing personnel at the film laboratory that an alert has been received; and assigning a film development priority to the transaction based upon the alert by the film processing personnel.

3. A film processing method comprising:

displaying instructions to a customer, including photo delivery options and prices during a film processing transaction by a film drop-off kiosk;

recording a customer choice for a photo delivery time by the film drop-off kiosk;

accepting payment from the customer based upon the customer choice by the film drop-off kiosk;

determining whether the photo delivery time associated with the customer choice is short enough to require an alert to be sent to a film laboratory by the film drop-off kiosk;

if the alert is required, sending an alert message to the film laboratory by the film drop-off kiosk;

receiving the alert message by the film laboratory;

notifying film processing personnel at the film laboratory that an alert has been received;

assigning a film development priority to the transaction based upon the alert by the film processing personnel.

4. A film processing method comprising:

displaying instructions to a customer, including photo delivery options and a special promotion during a film processing transaction by a film drop-off kiosk;

recording a first customer choice for a photo delivery time and a second customer choice for the special promotion by the film drop-off kiosk;

determining a price based upon the first and second choices by the film drop-off kiosk;

determining whether the photo delivery time associated with the first customer choice is short enough to require an alert to be sent to a film laboratory by the film drop-off kiosk;

if the alert is required, sending an alert message to the film laboratory by the film drop-off kiosk;

receiving the alert message by the film laboratory;

notifying film processing personnel at the film laboratory that an alert has been received;

assigning a film development priority to the transaction based upon the alert by the film processing personnel.

5. A film processing method comprising:

displaying instructions to a customer, including photo delivery options and prices during a film processing transaction by a film drop-off kiosk;

recording a customer choice for a photo delivery time by the film drop-off kiosk;

delivering a bar code label identifying the transaction to the customer;

determining whether the photo delivery time associated with the customer choice is short enough to require an alert to be sent to a film laboratory by the film drop-off kiosk;

if the alert is required, sending an alert message to the film laboratory by the film drop-off kiosk;

receiving the alert message by the film laboratory;

assigning a film development priority to the transaction based upon the alert by the film processing personnel;

reading the bar code label by a bar code reader coupled to the film drop-off kiosk during a subsequent use of the kiosk by the customer; and displaying a status of the transaction by the film drop-off kiosk.

6. A film drop-off apparatus comprising:

a computer;

a display controlled by the computer which displays instructions to a customer, including photo delivery options during a film processing transaction;

an input device controlled by the computer which records a customer choice for a photo delivery time; and communication circuitry which sends an alert message to the film laboratory based upon the customer choice;

wherein the computer causes the communication circuitry to send the alert message if the photo delivery time associated with the customer choice is short enough.

7. A film drop-off apparatus comprising:

a computer;

a display controlled by the computer which displays instructions to a customer, including photo delivery options during a film processing transaction;

an input device controlled by the computer which records a customer choice for a photo delivery time;

a printer controlled by the computer which prints a bar code identifying the transaction for the customer;

communication circuitry controlled by the computer which sends an alert message to the film laboratory based upon the customer choice;

a bar code reader controlled by the computer which reads the bar code;

wherein the display also displays status information to the customer following reading of the bar code by the bar code reader during a subsequent use of the computer by the customer; and wherein the computer causes the communication circuitry to send the alert message if the photo delivery time associated with the customer choice is short enough.

8. A film drop-off apparatus comprising:

a computer;

a display controlled by the computer which displays instructions to a customer, including photo delivery options during a film processing transaction and promotional messages;

an input device controlled by the computer which records a first customer choice for a photo delivery time and a second choice for promotional messages;

wherein the computer applies special discounts in response to the second choice;

a number of payment modules controlled by the computer which allow a customer to pay for the transaction; and communication circuitry controlled by the computer which sends an alert message to the film laboratory based upon the first customer choice;

wherein the computer causes the communication circuitry to send the alert message if the photo delivery time associated with the customer choice is short enough.

9. A film drop-off apparatus comprising:

a self-service banking terminal, including a display which displays instructions to a customer, including photo delivery options during a film processing transaction;

an input device controlled by the computer which records a customer choice for a photo delivery time;

communication circuitry which sends an alert message to the film laboratory based upon the customer choice;

wherein the computer causes the communication circuitry to send the alert message if the photo delivery time associated with the customer choice is short enough;

a number of payment modules which allow a customer to pay for the transaction, as well as complete a banking transaction; and a film-drop counter containing a storage bin for film envelopes deposited by the customer.

* * * * *